Patented Mar. 3, 1953

2,630,420

UNITED STATES PATENT OFFICE 2,630,420

ADHESIVE COMPOSITION

Clyde E. Gleim, Akron, Ohio, assignor to Wingfoot Corporation, Akron, Ohio, a corporation of Delaware No Drawing. Application November 26, 1949, Serial No. 129,703

4 Claims. (Cl. 260—45)

This invention relates to a new type of cementitious material. More particularly, it relates to a liquid adhesive composition comprising a rubbery butadiene-acrylonitrile (Buna-N) copolymer and an amine-modified phenolic-aldehyde resin prepared by the reaction of a phenol, an aldehyde and an amine. The invention also relates to the method of preparation.

Many cold-setting cements or liquid adhesives are known in the prior art, but these have their limitations when used under certain conditions. A cold-setting liquid adhesive has been discovered which may be used successfully under nearly all possible conditions of use.

The cold-setting liquid adhesive of this invention may be used in attaching any type of material to a similar material or to a dissimilar material. Particularly, this new adhesive finds exceptionally satisfactory use in bonding leather to leather, as for example, in the manufacture of shoes, where the outsole may be secured to the uppers by means of this new cement. All types of plastics may be bonded together by this new adhesive, exceptional bonding strengths being obtained when leather is secured to leather or other material.

The basic ingredients of the new adhesive may be broadly classified as a rubbery butadiene-acrylonitrile copolymer and an arylamine-modified phenolic aldehyde type resin. These two ingredients, when mixed in proper proportions, produce a base cement which, when diluted in a proper solvent, will form a liquid adhesive of exceptional strength.

The synthetic rubber component of the adhesive is a butadiene-acrylonitrile copolymer in which the ratio of butadiene to acrylonitrile, is any giving a rubber-like product. Any conjugated butadiene may be used in producing the synthetic rubber component of the adhesive but it is preferred to use butadiene-1,3. Other butadienes are isoprene, 2,3-dimethyl butadiene-1,3, 2-ethyl butadiene-1,3, 1,3-dimethyl butadiene-1,3, etc.

Acrylonitrile is preferred in the copolymerization reaction with butadiene. However, other acrylonitriles, as for example, alpha chloracrylonitrile, alpha methyl acrylonitrile, alpha ethyl acrylonitrile and alpha and beta allyl acrylonitriles may also be used.

In reacting the butadiene with the acrylonitrile, any ratio of butadiene to acrylonitrile, ranging from 95 parts of butadiene to 5 parts of acrylonitrile to 30 parts of butadiene to 70 parts of acrylonitrile, may be used, but the preferred ratio is 55 parts of butadiene to 45 parts of acrylonitrile. It has been discovered that the higher nitrile rubbers, that is, ratios of butadiene to acrylonitrile ranging from about 70/30 to 55/45, facilitate the formation of a homogeneous solution of the base cement in a proper solvent to form the desired liquid adhesive. The copolymerization may be carried out as a mass polymerization or as an emulsion polymerization in the presence of a polymerization catalyst. Modifiers, emulsifiers, buffers etc. may be present. Any suitable method of precipitating the resulting latex from the emulsion polymerization may be used.

The rubbery butadiene-acrylonitrile copolymer may be incorporated with the resin component of this cement directly on a rubber mill or other suitable mixing equipment. However, it is found desirable to compound the rubbery butadiene-acrylonitrile copolymer before mixing with the resin. Desirable compounding agents are the pigments. It has been found that proper pigments increase the tensile strength of the copolymer and the tensile strength of the copolymer has a direct effect upon the characteristics of the resulting adhesive. Any of the well-known rubber pigments or fillers may be used. A preferred pigment is Kalvan, which is a precipitated whiting of fine particle size supplied by R. T. Vanderbilt, New York, N. Y. All types of carbon black may also be used. Other useful pigments are silene, a calcium silicate, all types of clays, kieselguhr, slate and fuller's earth. These compounds may be conveniently referred to as fillers, pigments or reinforcing agents.

In addition to these compounding ingredients, sulfur may also be used and any of the various accelerators known in the rubber compounding art. Preferred accelerators are mercaptobenzothiazole, tetra methyl thiuram disulfide, diphenylguanidine, di(benzothiazyl) disulphide, which are milled into the base cement during compounding. In addition to milling an accelerator into the rubber stock, an accelerator may be added to the cement, e. g., morpholine or butyl eight (dibutylaminodithio carbamate). These may be used alone or in solution form and may be added to the cement or the surfaces to be cemented may be washed with them. Also, the cemented surface, after drying, may be washed with the accelerator or any combination of these three methods of application may be used.

The reinforcing agents may be used in any proportion, ranging from one part to 100 parts per 100 parts of rubbery butadiene-acrylonitrile copolymer. However, it is preferred to use 15 parts to 45 parts per 100 parts of the copolymer.

The accelerator may be employed in the proportion of about 0.1 to 1 part per 100 parts of copolymer but it is preferred to employ about .7 part per 100 parts of copolymer.

The copolymer is compounded with the selected pigment, accelerator and sulfur on a rubber mill until the compounding ingredients are thoroughly mixed. The viscosity of the copolymer will not be greatly affected during this mixing operation where the ratio of butadiene to acrylonitrile used in making the copolymer is between about 65/35 and about 50/50 respectively, and particularly where the ratio is about 55/45 respectively. The milled copolymer is then placed in a suitable mixing apparatus, as for example, a churn, and mixed with a proper solvent until a mixture having a smooth consistency results.

The second critical ingredient of this invention is then added to this copolymer mixture. It has been discovered that any arylamine-modified phenolic-aldehyde synthetic resin resulting from the condensation of a phenol, an aldehyde and an arylamine may be used.

The phenols operable in producing the resin component of this cement are those having at least two of the carbon atoms of the phenol ring unsubstituted such as phenol, the naphthols, the salicylates, the dihydroxy benzenes (dihydric phenols), i. e., resorcinol, catechol and hydroquinone, the xylenoles, e. g., dimethyl phenol, the cresols and other alkyl-substituted phenols, phenyl-substituted phenols, and halo-substituted phenols.

The condensing aldehyde used in forming this resin may be any of the well-known aldehydes, as for example, formaldehyde, butyraldehyde, paraformaldehyde, etc.

The third component of this resin may be a primary amine having the general formula

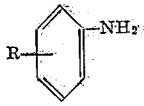

in which R is hydrogen, alkyl, alicyclic, aryl, or amino radicals. Specific members of this class are aniline, the alkyl-substituted arylamines such as the toluidines, ethyl aniline, the alicyclic-substituted arylamines, e. g., cyclohexyaniline, the aryl-substituted arylamines, e. g., phenyl aniline, etc. Other specific amines that may be used include the heterocyclic amine, furfurylamine, the alicyclic amine, cyclohexylamine, the naphthylamines, and the phenylenediamines. The resin may be prepared by reacting the phenol and the aldehyde in the presence of an arylamine and a suitable catalyst (e. g., $H_2SO_4$, $NH_3$, NaOH, etc.) under proper condition of heat (e. g., 80° C. to 100° C.) and for a suitable time (e. g., ½ to 2 hours). Both acid and alkaline type catalysts may be used. The resin may be rendered neutral by the addition of the required amount of a base, such as barium or calcium hydroxides, or of an acid, such as acetic, formic, etc. The resin is customarily dried before using it in the cement. The amine may be present in amount between .25 to 4.0 mols per mol of the phenol. The aldehyde may be present in an amount between .84 to 1.15 mols per mol of combined phenol and amine.

The resin is mixed with the butadiene-acrylonitrile copolymer in the churn until thorough mixing is achieved. The time of mixing will depend upon the type of resin being used and the consistency of the copolymer. This time may vary from about 2 hours to about 20 hours, and generally varies from about 4 hours to about 10 hours. The mixing is carried out at room temperature.

Ratios of rubber to resin may vary from about 15/85 to about 85/15, desirably from about 40/60 to 80/20 and it is preferred to use ratios of about 60/40 to about 67/33. It has been observed that at least 15% of the resin, based upon the total amount of rubber present, must be used in order to produce the improved adhesive of this invention.

It has been discovered that it is highly desirable to heat-treat the ingredients during this mixing operation in order to improve the adhesive characteristic of the resulting cement. It is believed that this heat treatment brings about a certain desirable chemical union between the rubber and the resin. This heat treatment also facilitates the solution of the rubber in the resin or the resin in the rubber.

The rubber-resin mixture may have a solids content from about 50% to about 100%, depending upon the amount of solvent that was employed in effecting the mixture. Where a low-viscosity rubber and a high-rubber resin is used, the amount of solvent necessary to bring about a proper mixture of the two ingredients is very small, but where a high-viscosity rubber and a low-rubber resin is used, a greater amount of solvent is necessary. Where no solvent is present, the rubber-resin mixture may be considered as being the base cement used in producing the liquid adhesive of the invention.

The base cement is mixed with a suitable solvent to form a liquid adhesive having a solids content of about 5% to about 70%. It is desirable to use the liquid adhesive in a concentration containing about 20% to about 30% solids.

Any mutual solvent for the rubber and the resin of this adhesive may be used. Thus, it is found that any ketone-type solvent has a mutual solvent action upon the resin and the rubber components. Useful solvents are acetone, methyl ethyl ketone, cyclohexanone, isopropyl ketone, methyl isobutyl ketone and methyl amyl ketone, depending upon the use to which the liquid adhesive is to be put, but certain blends of mutual solvents may be used to give the proposed drying rate. For example, where a high drying rate is required, a blend of 50 parts of methyl ethyl ketone and 50 parts of the rubber and resin is preferred. Where a slower drying rate is desired, those solvents having a low vapor pressure are to be used.

The following examples, with the exception of Example 1, give the details involved in the preparation of the resin component of the adhesive of this invention and the resulting adhesive composition obtained when the resin is compounded with a butadiene-acrylonitrile rubber obtained from the copolymerization of 55 parts of butadiene and 45 parts of acrylonitrile. Example 1 is presented as a basis for comparing the improvements in adhesive qualities of the adhesive of this Example with the adhesives of the other examples. The resin used in Example 1 is an unmodified phenol-aldehyde type of resin whereas each of the other examples involves the use of an arylamine modified phenol-aldehyde type resin. In the following examples, it is to be noted that the aldehyde may be used in molecular deficiency, equality or excess of the combined phenol and amine used. Also, the phenol may be used in molecular deficiency, equality or excess of the amine used.

EXAMPLE 1

Phenol-formaldehyde resin cement

Two mols of phenol were condensed with 1.9 mols of formaldehyde in the presence of 3 cc. of 4N sulfuric acid at reflux temperature for one hour. The catalyst was neutralized by treatment with barium hydroxide and the resin dried by evaporating the occluded water.

Two and one half pounds of this resin was mixed with the following rubber mixture, which mixture was used in forming an adhesive with each of the resins of the following examples. 100 parts of butadiene-acrylonitrile copolymer resulting from the emulsion polymerization of 55 parts of butadiene and 45 parts of acrylonitrile were compounded with 1.5 parts of sulfur, 0.7 part of di (benzothiazyl) di-sulphide and 30 parts of Kalvan.

Five pounds of this compounded rubber was then mixed with 2.5 pounds of the resin in 3 gallons of methyl ethyl ketone to produce a cold-set liquid adhesive containing 20% solids. A test sample of leather bonded to leather was made by holding the assembly of leather strips, 1 inch by 6 inches, coated with the adhesive, under a 50 pound per square inch pressure for 5 minutes and then subjecting the strips to a strip pull test after 24 hours. An average pull of 20 pounds was developed. This test used throughout the examples consists in fixing adjacent ends of the two strips in clamps, which are then separated at the rate of about 2 inches per minute by a machine which measures the pull in pounds required to separate the one inch wide strips.

EXAMPLE 2

Aniline-phenol-formaldehyde resin cement

Thirty-three mols of phenol were mixed with 33 mols of aniline and to this mixture was added 55.3 mols of formaldehyde in the presence of 66 cc. of 4N sulfuric acid and the resulting mixture refluxed for one hour to produce a resin which was dried and compounded in accordance with the procedure set forth in Example 1. An average pull of 71 pounds was developed.

EXAMPLE 3 p-Phenylene diamine-phenol-formaldehyde resin cement

One third of a mol of para-phenylene diamine was mixed with 1.33 mols of phenol and then reacted with 1.5 mols of formaldehyde in the presence of 2 cc. of 4N sulfuric acid at reflux temperatures for 15 minutes to produce a resin which was dried, compounded and used in the manner described in Example 1. An average pull of 62.5 pounds was developed.

EXAMPLE 4 p-Amino phenol-phenol-formaldehyde resin cement

One tenth of a mol of para amino phenol was mixed with .5 mol of aniline and 1 mol of phenol and then reacted with 1.43 mols of formaldehyde in the presence of 2 cc. of 4N sulfuric acid at reflux temperatures for 1¼ hours to produce a resin which was dried, compounded and used in the manner described in Example 1. An average pull of 69 pounds was developed.

EXAMPLE 5

Aniline-resorcinol formaldehyde resin cement

Four tenths of a mol of resorcinol was reacted with 1.6 mols of aniline and 1.9 mols of formaldehyde in the presence of 1 cc. of 4N sulfuric acid at reflux temperatures for 2 hours to produce a resin which was dried, compounded and used in the manner described with respect to Example 1. An average pull of 77 pounds was developed.

EXAMPLE 6

Aniline-phenol-excess formaldehyde resin cement

One mol of aniline and 1 mol of phenol was condensed with 2.2 mols of formaldehyde in the presence of 2 cc. of 4N $H_2SO_4$ at reflux temperatures for 1½ hours to produce a resin which was dried, compounded and used in the manner described in Example 1. An average pull of 63 pounds was developed.

EXAMPLE 7

Aniline-phenol-excess formaldehyde resign cement

The procedure of Example 6 above was followed, with the exception that 0.189 gram of ammonia was used as a catalyst to produce a resin which was dried, compounded and used in the manner described in Example 1. An average pull of 58 pounds was developed.

EXAMPLE 8

Aniline-p-phenyl phenol-formaldehyde resin cement

One mol of para-phenyl phenol and 1 mol of aniline was condensed with 1.68 mols of formaldehyde in the presence of 2.0 cc. of 4N sulfuric acid at reflux temperatures for 1¼ hours to give a resin which was dried, compounded and used in the manner described in Example 1. An average pull of 67 pounds was developed.

EXAMPLE 9

Aniline-m-cresol-formaldehyde resin cement

A mixture of 1 mol of m-cresol and 1 mol of aniline was treated with 2.3 mols of formaldehyde containing 2.0 cc. of 4N sulfuric acid at reflux temperatures to give a resin which was dried, componded and used in the manner described in Example 1. An average pull of 72 pounds was developed.

EXAMPLE 10

Aniline-p-tertiary-amyl-phenol-formaldehyde resin cement

One mol of p-tertiary amyl phenol and 1 mol of aniline was condensed with 1.68 mols of formaldehyde in the presence of 2 cc. of 4N sulfuric acid at reflux temperatures for 1.1 hours to give a resin which was dried, compounded, and used in the manner described in Example 1. An average pull of 65 pounds was developed.

EXAMPLE 11

Aniline-o-toluidine-formaldehyde resin cement

One mol of o-toluidine and 1 mol of phenol was condensed with 1.68 mols of formaldehyde in the presence of 2 cc. of 4N sulfuric acid at reflux temperatures for 1¼ hours to give a resin which was dried, compounded and used in the manner described in Example 1. An average pull of 66 pounds was developed.

EXAMPLE 12

*Aniline-p-chlorphenol-formaldehyde resin cement*

One and one half mols of p-chlorphenol and 1½ mols of anine was condensed with 2.52 mols of formaldehyde in the presence of 3.0 cc. of 4N sulfuric acid at reflux temperatures for ½ hour to give a resin which was dried, compounded and used in the manner described in Example 1. An average pull of 62 pounds was developed.

EXAMPLE 13

*Aniline-phenol-diphenylamine-formaldehyde resin cement*

One mol of phenol, 0.5 mol of aniline, and 0.05 mol of diphenylamine was condensed with 1.30 mols of formaldehyde containing 2.0 cc. of 4N sulfuric acid at reflux temperatures for 1¼ hours to give a resin which was dried, compounded and used in the manner described in Example 1. An average pull of 66 pounds was developed.

EXAMPLE 14

*Cyclohexylamine-phenol-formaldehyde resin cement*

Sixty-eight parts of cyclohexylamine was reacted with 125 parts of phenol and 128 parts of 40% formalin in the presence of 2 cc. of 4N sulfuric acid for 1 hour at reflux temperature to produce a resin which was dried and compounded in accordance with the procedure set forth in Example 1. An average pull of 74 pounds was developed.

EXAMPLE 15

*Aniline-phenol-formaldehyde resin cement*

One third of a mol of aniline was mixed with 1.33 mols of phenol and then reacted with 1.5 mols of formaldehyde in the presence of 2 cc. of 4N sulfuric acid at reflux temperatures for 15 minutes to produce a resin which was dried, compounded and used in the manner described in Example 1. An average pull of 40 pounds was developed.

EXAMPLE 16

One hundred parts of cyclohexanol was reacted with 93 parts of aniline and 135 parts of 40% formalin in the presence of 2 cc. of 4N sulfuric acid for 2 hours at reflux temperature to produce a resin which was dried and compounded in accordance with the procedure set forth in Example 1. An average pull of 70 pounds was developed.

EXAMPLE 17

Ninety-four parts of phenol was reacted with 62 parts of aniline, 28 parts of furfuryl amine and 135 parts of 40% formalin in the presence of 2 cc. of 4N sulfuric acid for 2 hours at reflux temperature to produce a resin which was dried and compounded in accordance with the procedure set forth in Example 1. An average pull of 60 pounds was developed.

The formulation used in each of the foregoing examples in preparing the cement tested by the strip pull method was as follows:

COMPOSITION A

| | Parts |
|---|---|
| Copolymer (butadiene 55 parts—acrylonitrile 45 parts) | 100 |
| Sulfur | 1.5 |
| Altax (di(benzothiazyl) disulfide) | 0.70 |
| Kalvan (powdered calcium carbonate) | 30 |

COMPOSITION B

| | | |
|---|---|---|
| Composition A | lbs | 5 |
| Resin (Examples 2 through 17) | lbs | 2.5 |
| Solvent (methyl ethyl ketone) | gals | 3 |

It is to be understood that where the term "rubber" is used throughout the specification is meant any of the butadiene-acrylonitrile copolymers hereinbefore referred to in detail when prepared in accordance with any of the ratios of starting materials set forth, and that by the term "resin" is meant the resin resulting from the condensation of a phenol, an aldehyde and an arylamine.

Throughout the specification, parts are by weight unless otherwise specified.

It will thus be seen that there has been provided by this invention a composition of matter and an article of manufacture in which various objects are successfully achieved. Since many possible variations may be made in the embodiments above set forth, it is to be understood that all matter hereinbefore set forth is to be interpreted as illustrative and not in a limiting sense. It will be further understood that while it has been attempted to explain this invention in view of presently accepted theories, the claims are not to be construed as dependent upon any particular theory relative to the formation of these substances. Suitable changes may be made in the details of the process without departing from the spirit or scope of the present invention, the proper limits of which are defined in the appended claims.

This is a continuation-in-part application of my application Serial No. 621,591, filed October 10, 1945, now abandoned, for adhesive composition.

I claim:

1. A cement comprising a rubbery butadiene-acrylonitrile copolymer and a ketone-soluble resin resulting from the reaction of phenol, formaldehyde and aniline in which formaldehyde is present in an amount between .84 to 1.15 mols per mol of the combined phenol and aniline and in which 1 mol of aniline is present per mol of phenol, the ratio of rubbery copolymer to the resin ranging from 15/85 to 85/15.

2. A cement comprising a rubbery butadiene-acrylonitrile copolymer and a ketone-soluble resin resulting from the reaction of phenol, formaldehyde and aniline in the proportions of 33 mols of phenol, 55.3 mols of formaldehyde, and 33 mols of aniline, the ratio of rubbery copolymer to the resin ranging from 15/85 to 85/15.

3. A cement comprising a synthetic rubber resulting from the reaction of a mixture of 55 parts of butadiene-1,3 and 45 parts of acrylonitrile, and a ketone-soluble resin resulting from the reaction of phenol, formaldehyde and aniline in the proportions of 33 mols of phenol, 55.3 mols of formaldehyde, and 33 mols of aniline, the ratio of rubbery copolymer to the resin ranging from 15/85 to 85/15.

4. A cement comprising a rubbery butadiene-acrylonitrile copolymer and a ketone-soluble resin resulting from the reaction of phenol, formaldehyde and aniline in the proportions of 33 mols of phenol, 55.3 mols of formaldehyde, and 33 mols of aniline, the ratio of the rubbery copolymer to the resin ranging from 60/40 to 67/33.

CLYDE E. GLEIM.

(References on following page)

References Cited

The following references are of record in the file of this patent:

UNITED STATES PATENTS

| Number | Name | Date |
|---|---|---|
| 1,873,799 | Vacher | Aug. 23, 1932 |
| 1,955,731 | Bender | Apr. 24, 1934 |
| 2,054,483 | Martin | Sept. 15, 1936 |
| 2,376,854 | Saunders | May 22, 1945 |
| 2,398,890 | Howard | Apr. 23, 1946 |
| 2,405,038 | Jennings | July 30, 1946 |
| 2,554,262 | Nagel | May 22, 1951 |

FOREIGN PATENTS

| Number | Country | Date |
|---|---|---|
| 607,268 | Great Britain | Aug. 27, 1948 |

OTHER REFERENCES

Ser. No. 357,622, Wildschut (A. P. C.), published April 20, 1943.